(12) United States Patent
Hashimoto et al.

(10) Patent No.: US 6,447,415 B1
(45) Date of Patent: Sep. 10, 2002

(54) TENSIONER WITH PLUNGER STOPPER MECHANISM

(75) Inventors: Hiroshi Hashimoto; Kozo Inoue, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/722,807

(22) Filed: Nov. 27, 2000

(30) Foreign Application Priority Data

Nov. 26, 1999 (JP) .......................................... 11-336764

(51) Int. Cl.[7] ................................................ F16H 7/08
(52) U.S. Cl. ...................................... 474/110; 474/109
(58) Field of Search .................................. 474/110, 138, 474/101, 109, 136, 117; 100/297, 323–326; 403/31, 271, 322.2, 79, 235

(56) References Cited

U.S. PATENT DOCUMENTS

| | | | | |
|---|---|---|---|---|
| 4,250,942 A | * | 2/1981 | Dreher et al. | 160/297 |
| 5,004,449 A | * | 4/1991 | Ojima | 474/138 |
| 5,073,158 A | * | 12/1991 | Ojima | 474/111 |
| 5,246,404 A | * | 9/1993 | Ojima | 474/111 |
| 5,370,584 A | * | 12/1994 | Todd | 474/110 |
| 5,676,614 A | | 10/1997 | Inoue | |
| 5,782,625 A | * | 7/1998 | Young | 474/110 |

FOREIGN PATENT DOCUMENTS

| | | | |
|---|---|---|---|
| GB | 2181820 A | * | 4/1987 |
| JP | 07042804 | | 2/1995 |
| JP | 7317854 | | 12/1995 |

* cited by examiner

Primary Examiner—David A. Bucci
Assistant Examiner—Marcus Charles
(74) Attorney, Agent, or Firm—Dann, Dorfman, Herrell and Skillman; Henry H. Skillman

(57) ABSTRACT

A tensioner includes a plunger stopper mechanism for holding a plunger in an inoperative position in which the plunger is retracted into a cylinder chamber formed in a tensioner body. The plunger stopper mechanism has a radial pin hole formed in the tensioner body and communicating with the cylinder chamber, an annular pin stopper groove formed in a circumference of the plunger, and a stopper pin removably inserted through the radial pin hole into the annular pin hole. The radial pin hole has a center line extending parallel to a tangent to the bottom of the annular pin stopper groove and offset from the tangent toward an open side of the annular pin stopper groove, and the annular pin stopper groove has a depth slightly greater than a diameter of the stopper pin, so that a side face of the stopper pin is held in contact with the bottom of the annular pin stopper groove. The stopper pin has a long insertion depth relative to the tensioner body and is surely held in position against removal by a contact resistance or friction acting between the side face of the stopper pin and the bottom of the annular pin stopper groove.

4 Claims, 5 Drawing Sheets

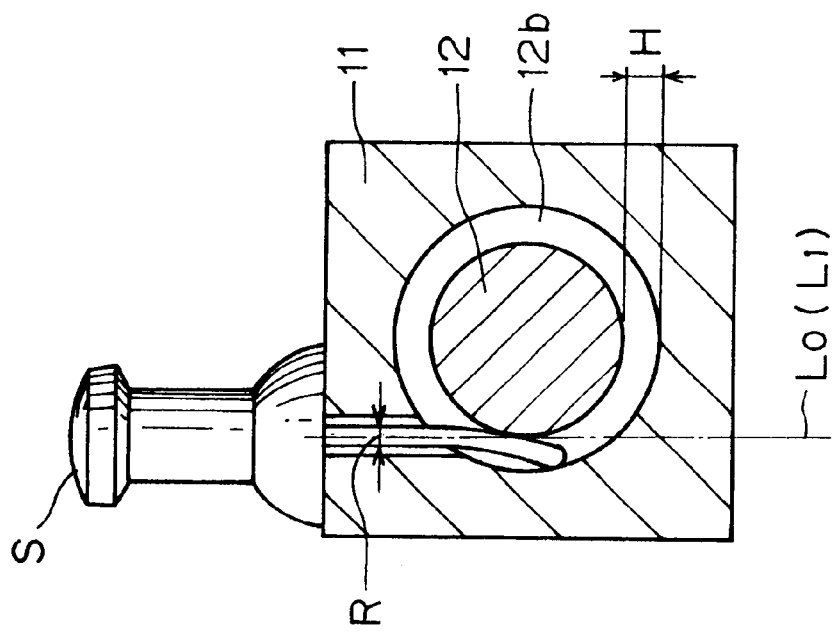
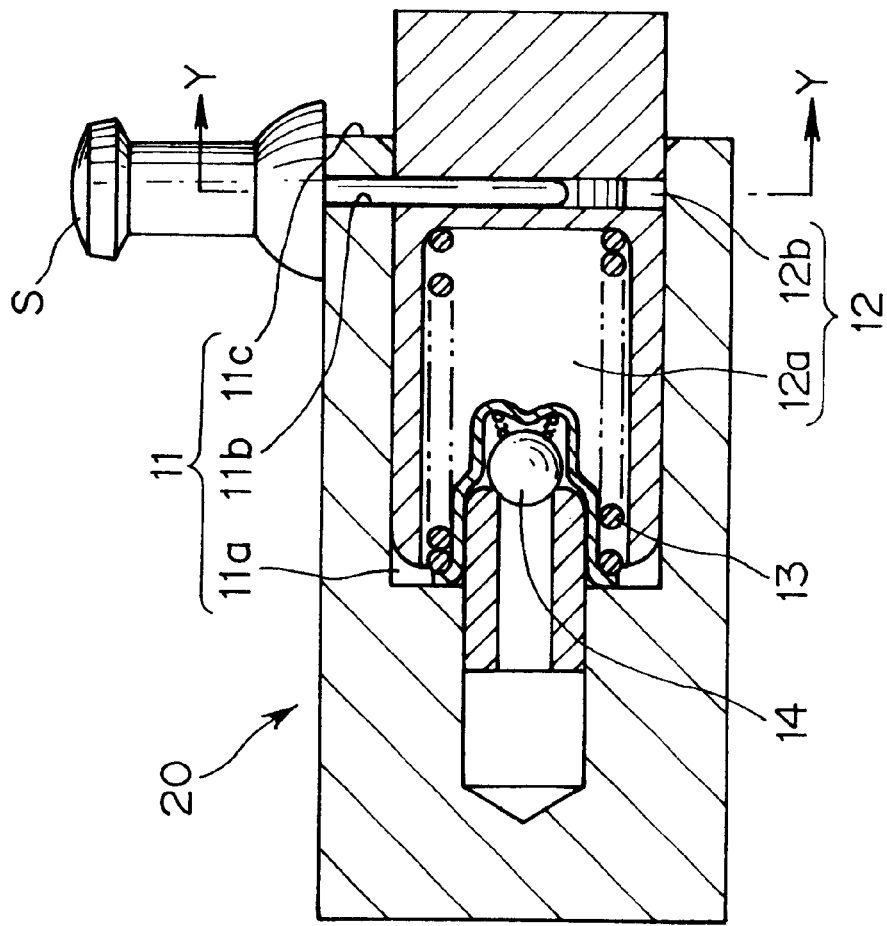

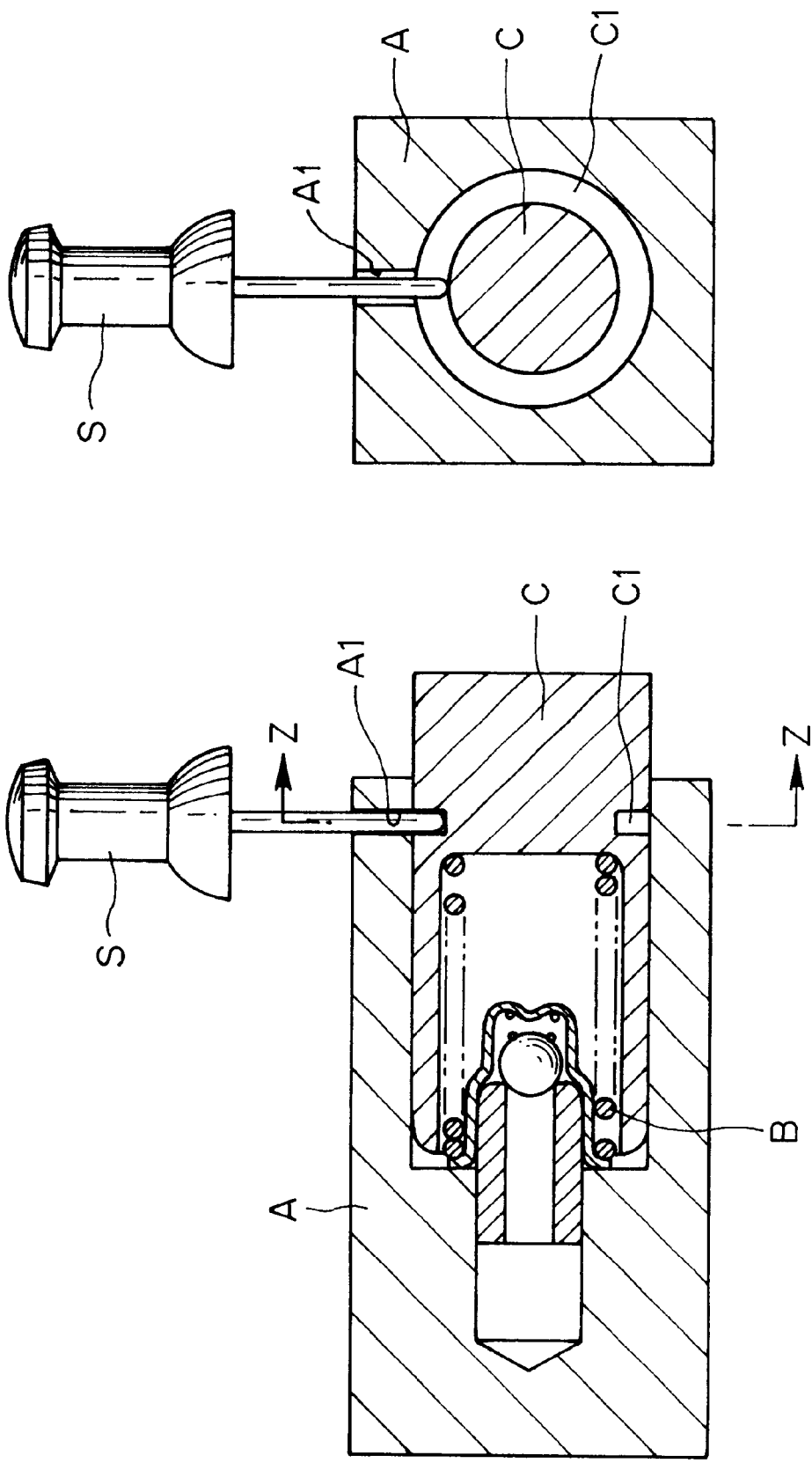

TENSIONER WITH PLUNGER STOPPER MECHANISM

BACKGROUND OF THE INVENTION

1. Field of the Invention

The present invention relates generally to a tensioner for applying a tension to a timing chain or a timing belt used for driving a camshaft of an automobile engine, and more particularly to a tensioner provided with a plunger stopper mechanism.

2. Description of the Related Art

FIGS. 4A and 4B illustrate a conventional tensioner used with a timing chain for transmitting a power between a crankshaft and a camshaft of an engine. The tensioner includes a tensioner body A and a plunger C urged by a spring B to project outward from the tensioner body A. The tensioner body A has a radial pin hole A1 formed therein, and the plunger C has an annular stopper hole C1 formed circumferentially in an outside surface thereof. The annular stopper hole C1 is aligned with the pin hole A1 when the plunger C is forced into the tensioner body A (refer to the Japanese Patent Laid-open Publication No. HEI-7-42804).

When such a tensioner is mounted on an engine, the plunger C is pushed inside the tensioner body A to such an extent that the pin hole A1 is aligned with the annular stopper groove C1, and a stopper pin S is inserted through the pin hole A1 into the stopper groove C1, whereby the plunger C can be fixed to the tensioner body A. After the tensioner is fixed to the engine, the stopper pin S is removed, whereupon the plunger C is pushed by the spring B out from the tensioner body A to pressure the chain and thus apply a tension thereto.

However, in the conventional tensioner, when the plunger C and the tensioner body A are pinned by the stopper pin S, the front end of the stopper pin S is inserted until it abuts against the bottom of the annular stopper groove C1 of the plunger C. The stopper pin S is able to pin the plunger C to the tensioner body A, however, the annular stopper groove C1 cannot be formed sufficiently deep because of the limitations on the shape and dimension of the plunger C. Accordingly, a sufficient insertion depth, which is required for the stopper pin S to keep the stopper pin S in an operating or stopping position within the annular stopper groove C1, cannot be obtained.

Thus, the conventional tensioner is unable to secure a slip-out prevention of the stopper pin S, or rather the stopper pin S can fall out when subjected to a slight impact and vibrations created during assembly of the tensioner relative to the engine. In such a case, a troublesome assembling work to the engine is unavoidably required.

FIG. 5 illustrates a tensioner that has improved the foregoing problem, in which the plunger C has a radial pin hole C2 formed in a front end portion thereof for the passage therethrough of the stopper pin S, and the tensioner body A has a pin stopper hole A2 and an oblong pin insertion hole A3 formed in diametrically opposite relation in the circumferential wall of a front end portion of the tensioner body A (refer to the Japanese Patent Laid-open Publication No. HEI-8-4861).

The improved tensioner still has a drawback that the pin insertion hole A3, pin hole C2 and pin stopper hole A2 require a machining accuracy sufficient to enable the stopper pin S to be inserted through these three holes A3, C2 and A2. In addition, alignment of these three holes when inserting the stopper pin S increases a burden of work. Further, since an extra pull-out force is required when removing the stopper pin S, the stopper pin S has to be provided with a ring-shaped pull-out portion S1. Thus, the stopper pin S must be provided as an exclusive component for the tensioner.

Accordingly, it is a general object of the invention to overcome the problems associated with the prior art devices.

A more specific object of the present invention is to provide a tensioner having a plunger stopper mechanism which is capable of locking the plunger in position against movement relative to the tensioner body, is able to protect the stopper pin against slip-off even when subjected to a shock force or Impact during assembly of the tensioner to an engine, and can secure smooth sliding movement of the plunger relative to the tensioner body while the engine is operating.

SUMMARY OF THE INVENTION

According to the present invention, there is provided a tensioner comprising: a tensioner body adapted to be mounted to a fixed member; a plunger slidably fitted in a cylinder chamber formed in the tensioner body; a plunger spring acting between the tensioner body and the plunger to urge the plunger in a direction to project from the cylinder chamber; and a plunger stopper mechanism having a radial pin hole formed in the tensioner body and communicating with the cylinder chamber, an annular pin stopper groove formed in a circumference of the plunger, and a stopper pin removably inserted through the radial pin hole into the annular pin hole to lock the plunger in an inoperative position in which the plunger is retracted into the cylinder chamber. The radial pin hole is substantially tangent to the bottom of the annular pin stopper groove, and the stopper pin has a side face held in contact with the bottom of the annular pin stopper groove.

In one preferred form of the present invention, the radial pin hole has a center line extending parallel to a tangent to the bottom of the annular pin stopper groove and offset from the tangent toward an open side of the annular pin stopper groove, and the annular pin stopper groove has a depth slightly greater than a diameter of the stopper pin.

With this arrangement, the side surface of the stopper pin is held in contact with the bottom of the annular pin stopper groove. Since the length of a portion of the stopper pin being inserted in the tensioner body through the pin hole becomes greater than the length in the conventional mechanisms, the posture of the stopper pin being inserted is stabilized, and the stopper pin held in its inserted position against removal by the action of a contact resistance created between the side face of the stopper pin and the bottom of the annular pin stopper groove.

In another preferred form of the present invention, the radial pin hole has a center line tangent to the bottom of the annular pin stopper groove, the annular pin stopper groove has a depth slightly greater than a diameter of the stopper pin, and the stopper pin has a front end portion being resiliently flexed to thereby urge the side surface of the stopper pin into pressure contact with the bottom of the annular pin stopper groove.

With this arrangement, the removal or slip-off of the stopper pin is prevented still more securely because the side surface of the stopper pin is urged against the bottom of the annular pin stopper groove by the resiliency of the front end portion of stopper pin being flexed.

It is preferable that when the stopper pin is removed from the annular pin stopper groove and the pin hole to allow the plunger to move in the direction to project from the cylinder chamber by the force of the plunger spring, the annular pin stopper groove is in radial alignment with an open end edge of the cylinder chamber.

With this arrangement, when an engine incorporating therein the tensioner of the invention is operating, a lubricating oil can ooze or leak out from the cylinder chamber to the outside of the tensioner while adhering to the outer surface of the plunger and accumulate in the annular pin stopper groove. The lubricating oil is in turn supplied from the annular pin stopper groove to the slide surface between the cylinder chamber and the plunger to thereby guarantee smooth sliding movement of the plunger.

The terms "tangent (line) to the bottom of the annular pin stopper groove" used herein with respect to the plunger stopper mechanism of the tensioner refer to a tangent line that is set on the basis of the bottom of the annular pin stopper groove formed on the circumference of the plunger.

Further, the tensioner with a plunger stopper mechanism of the invention is not only applied to a hydraulic tensioner, but it may also be applied to a ratchet tensioner, or even to a combined ratchet-and-hydraulic tensioner.

And, the tensioner with a plunger stopper mechanism of the invention is able to apply a tension not only to a timing chain or belt used for performing timed driving between a crankshaft and a camshaft of the engine. The timing chain may include a roller chain and a silent chain, and the timing belt may include a toothed belt.

BRIEF DESCRIPTION OF THE DRAWINGS

FIG. 3A is a longitudinal cross-sectional view of a tensioner having a plunger stopper mechanism according to a second embodiment of the present invention;

FIG. 3B is a cross-sectional view taken along the line Y—Y of FIG. 3A;

FIG. 4A is a longitudinal cross-sectional view of a conventional tensioner having a plunger stopper mechanism;

FIG. 4B is a cross-sectional view taken along the line Z—Z of FIG. 4A; and

DETAILED DESCRIPTION OF THE PREFERRED EMBODIMENTS

Figure 1A:
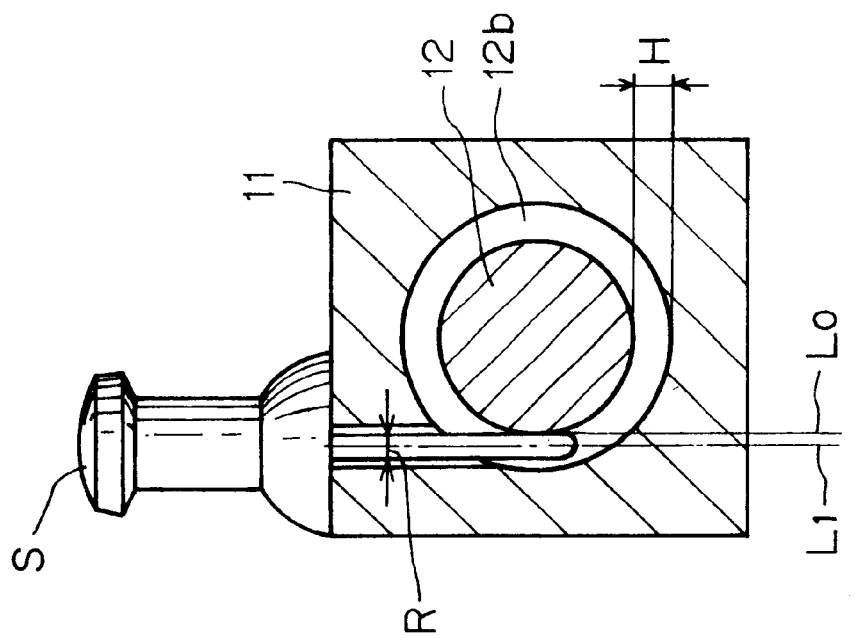
FIG. 1A is a longitudinal cross-sectional view of a tensioner having a plunger stopper mechanism according to a first embodiment of the present invention.

Certain preferred embodiments of the invention will be described with reference to the accompanying drawings, in which like reference characters designate like or corresponding parts throughout the several views.

Figure 1B:
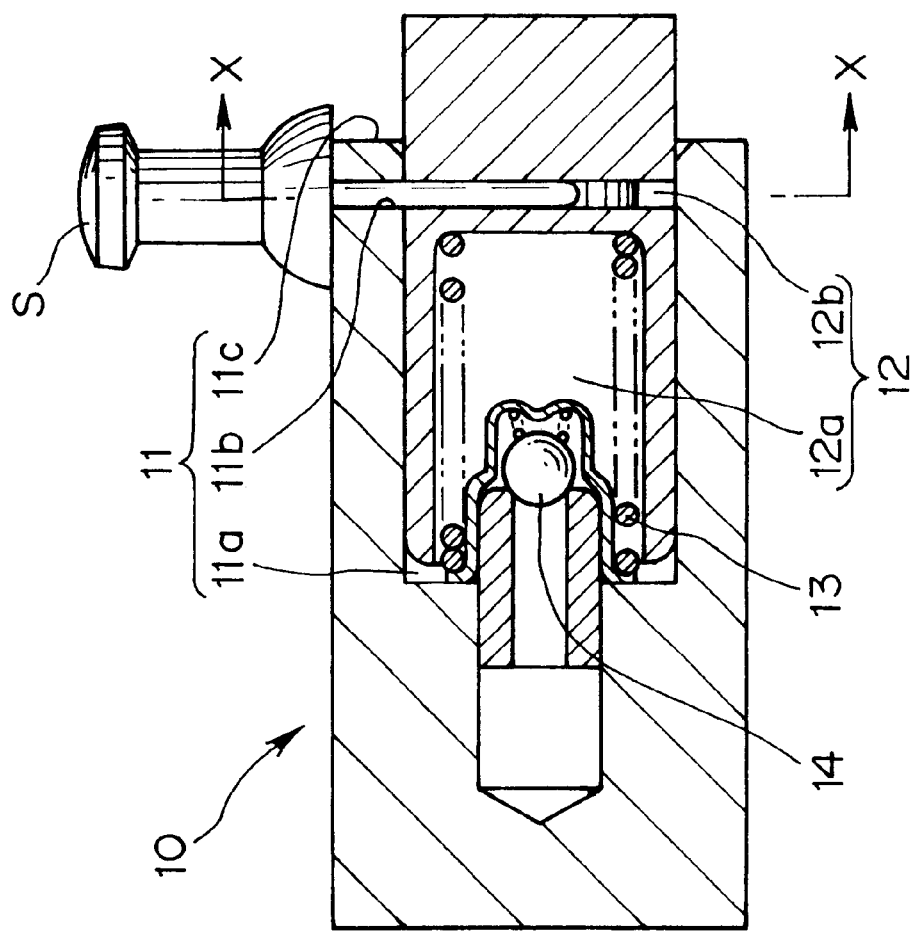
FIG. 1B is a cross-sectional view taken along the line X—X of FIG. 1A.

FIGS. 1A and 1B show a chain tensioner having a plunger stopper mechanism according to a first embodiment of the present invention. As shown in FIG. 1A, the tensioner 10 is a hydraulic tensioner constructed to apply an appropriate tension to a timing chain of an automobile engine (neither shown). The hydraulic tension 10 includes a tensioner body 11 adapted to be mounted on a wall of the engine, and a plunger 12 slidably fitted in a cylinder chamber 11a formed inside the tensioner body 11.

The plunger 12 has an internal hollow portion 12a formed therein. The hollow portion 12a has one end opening toward the bottom wall of the cylinder chamber 11a. A plunger spring 13 is received in the hollow portion 12a and acts between the bottom of the hollow portion 12a and the bottom of the cylinder chamber 11a so as to urge the plunger 12 in a direction to project from the cylinder chamber 11a. A check valve 14 is provided on the bottom of the cylinder chamber 11a facing to the hollow portion 12a. The check valve 14 operates to allow passage therethrough of a lubricating oil in one direction from an oil supply source (not shown) to the hollow portion 12a while blocking reverse flow of the lubricating oil.

The hollow portion 12a of the plunger 12 is filled with the lubricating oil that is constantly supplied through the check valve 14. When the plunger 12 is forced into the cylinder chamber 11a by a force applied from the chain during operation of the engine, the hydraulic pressure inside the hollow portion 12a increases to thereby close the check valve 14. The lubricating oil trapped inside the hollow portion 12a is discharged to the outside of the tensioner 10 through a very small clearance or gap between the outside surface of the plunger 12 and the inside surface of the cylinder chamber 11a.

The plunger stopper mechanism associated with the tensioner 10 is designed to temporarily lock the plunger 12 in an inoperating position in which the plunger 12 is retracted into the tensioner body 11 by means of a stopper pin S, as will be described in detail.

The tensioner body 11 has a radial pin hole 11b formed therein for the passage therethrough of the stopper pin S. The pin hole 11b is perpendicular to the axis of the cylinder chamber 11a and communicates with the cylinder chamber 11a. The plunger 12 has an annular pin stopper groove 12b formed on the circumference thereof for engagement with the stopper pin S.

As shown in FIG. 1A, the pin hole 11b is substantially tangent to the bottom of the annular pin stopper groove 12b. More particularly, the pin hole 11b has a center line L1 extending parallel to a tangent line L0 of the bottom of the annular pin stopper groove 12b and slightly offset from the tangent line L0 toward an open side of the annular pin stopper groove 12b. The annular pin stopper groove 12b has a depth H slightly greater than the diameter R of the stopper pin S so that when the stopper pin S is inserted through the pin hole 11b into the annular pin stopper groove 12b, the side of the stopper pin S is in contact with the bottom of the annular pin stopper groove 12b. As shown in FIG. 1A, the annular pin stopper groove 12b has a width substantially equal to or slightly greater than the diameter R of the stopper pin S so that the side of the stopper pin S can be held in pressure contact with a side wall of the annular pin stopper groove under the force of the plunger spring 13.

Figure 2:
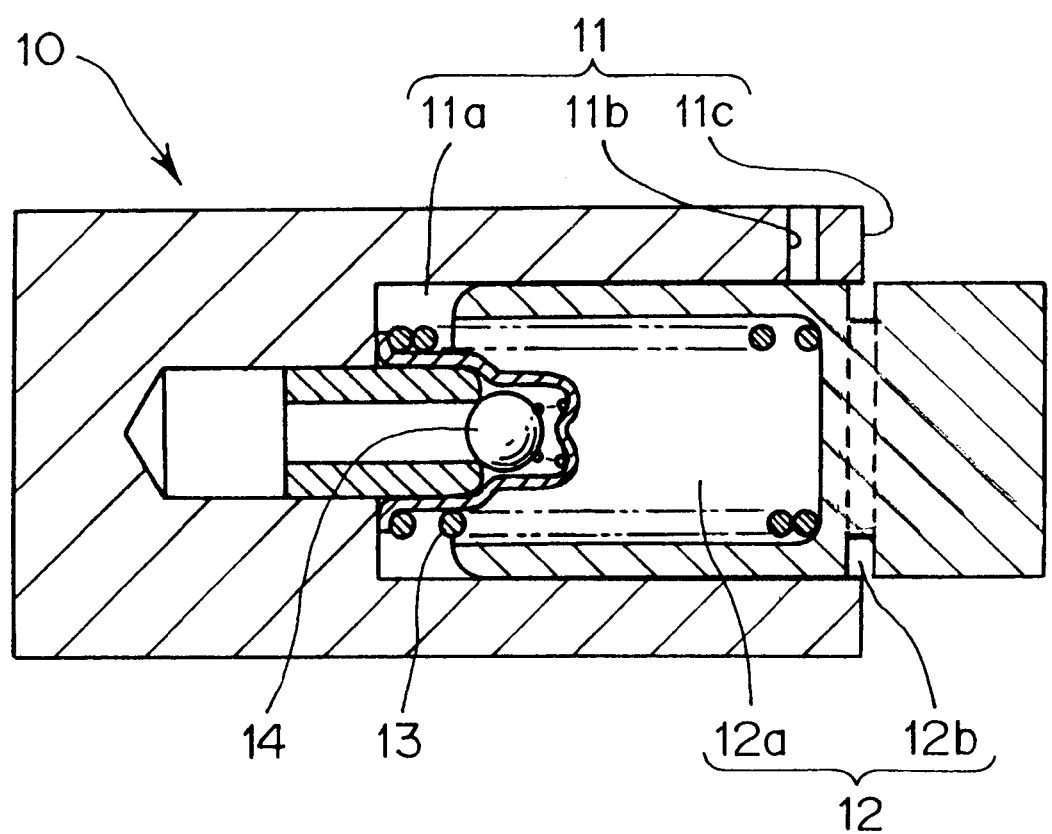
FIG. 2 is a view similar to FIG. 1A, but showing the chain tensioner as it is in an operating position.

Further, as shown in FIG. 2, the pin hole 11b and the annular pin stopper groove 12b are located such that when the stopper pin S is removed to allow the plunger 12 to take an operating position in preparation for operation of the engine, the plunger is allowed to move outwardly by the force of the spring 13 until the annular pin stopper groove 12b is in radial alignment with an open end edge 11c of the cylinder chamber 11a. With this arrangement, when the engine is operating, the lubricating oil can ooze or leak out from the cylinder chamber 11a to the outside of the tensioner 10 while adhering to the outer surface of the plunger 12 and accumulate in the annular pin stopper groove 12b.

The tensioner 10 equipped with the plunger stopper mechanism of this embodiment is able to surely lock the plunger 12 in position against movement relative to the tensioner body 11. When the stopper pin S is going to fall out from the plunger 12, a contact resistance is created between the side face of the stopper pin S and the bottom of the annular pin stopper groove 12b, whereby a slip-out of the stopper pin S can securely be prevented. In addition, smooth sliding movement of the plunger 12 can be achieved by the action of the lubricating oil accumulating in the annular pin stopper groove 12b.

FIGS. 3A and 3B show a tensioner 20 having a plunger stopper mechanism according to a second embodiment of the invention, in which these parts designated by the same reference characters as those in FIGS. 1A, 1B and 2 have the same constructions as in the foregoing embodiment.

In the second embodiment, the pin hole 11b is substantially tangent to the bottom of the annular pin stopper groove 12B. More particularly, the pin hole 11b has a center line L1 forming a tangent line L0 to the bottom of the annular pin stopper groove 12b. The depth H of the annular pin stopper groove 12b is slightly greater than the diameter R of the stopper pin S. With this arrangement, as the stopper pin S is inserted through the pin hole 11b into the annular pin stopper groove 12b, the front end portion of the stopper pin S is caused to resiliently bend or flex so that the side of the stopper pin S is held in pressure contact with the bottom of the annular pin stopper groove 12b by the resiliency of the stopper pin S being bent.

The tensioner 20 provided with the plunger stopper mechanism of the second embodiment is able to lock the plunger 12 in position against movement relative to the tensioner body 11. When the stopper pin S is going to fall out from the plunger 12, a contact resistance enhanced by the resiliency of the stopper pin S being bent acts between the side face of the stopper pin S and the bottom of the annular pin stopper groove 12b, to thereby prevent a slip-out of the stopper pin S still more securely.

Having a unique mechanism for temporarily locking the plunger in position as described above, the tensioner of the invention have various advantages, as follows.

Figure 5:
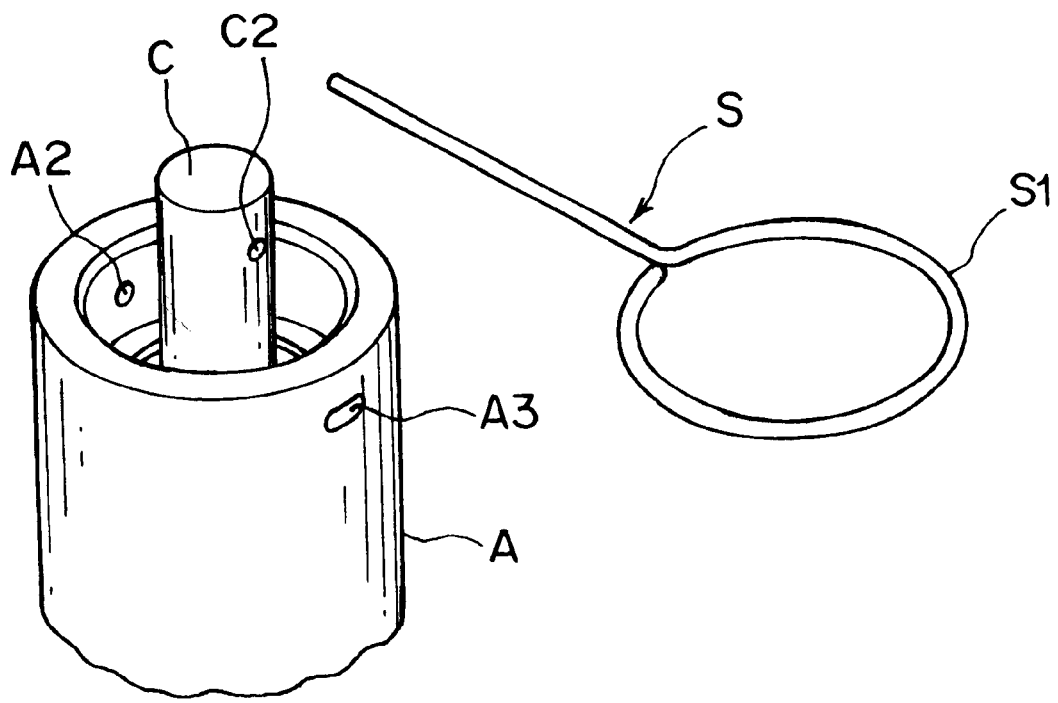
FIG. 5 is a schematic perspective view illustrating another conventional tensioner and a stopper pin used in combination.

Since the pin hole formed in the tensioner body is substantially tangent to the bottom of the annular pin stopper groove formed in the plunger, the side face of the stopper pin is held in contact with the bottom of the annular pin stopper surface. The length of a portion of the stopper pin being inserted through the pin hole in the tensioner body is longer than that in the conventional mechanisms in which the tip end of the stopper pin is held in abutment with the bottom of the annular pin stopper groove. By virtue of such greater insertion depth, the stopper pin has a relatively short length of exposed portion and hence is unlikely to cause accidental removal from the tensioner which may occur when the exposed portion is caught by a peripheral member during assembly of the tensioner relative to the engine. Thus, the stopper pin can stably hold the plunger in the retracted inoperative position. In addition, a contact resistance or friction acting between the side face of the stopper pin and the bottom of the annular pin stopper groove prevents the stopper pin from falling off the plunger even when the pin is subjected to shock forces vibrations during the assembly of the tensioner onto the engine. Further, as compared to the conventional tensioners such as shown in FIGS. 4A and 4B and FIG. 5, the pin hole and the annular pin stopper hole can easily be positioned. This allows use of standard stopper pins widely distributed in the market.

In the case of the stopper pin being resiliently flexed at a front end portion thereof, the side face of the stopper pin is urged against the bottom of the annular pin stopper groove. This arrangement can create an enhanced contact resistance friction against slip-off of the stopper pin.

And in addition, by virtue of the radial alignment of the open end edge of the cylinder chamber and the annular pin stopper groove achieved by the force of the plunger spring when the stopper pin is removed, while the engine is operating, the lubricating oil can ooze or leak from the cylinder chamber to the outside of the tensioner while adhering to the circumferential surface of the plunger and accumulate in the annular pin stopper groove. The lubricating oil is in turn supplied from the annular pin stopper groove to the contact surface between the plunger and the cylinder chamber to thereby enable smooth sliding movement of the plunger relative to the tensioner body.

Obviously, various minor changes and modifications of the present invention are possible in the light of the above teaching. It is therefore to be understood that within the scope of the appended claims, the present invention may be practiced otherwise than as specifically described.

What is claimed is:

1. A tensioner comprising:
   a tensioner body adapted to be mounted to a fixed member;
   a plunger slidably fitted in a cylinder chamber formed in the tensioner body;
   a plunger spring acting between the tensioner body and the plunger to urge the plunger in a direction to project from the cylinder chamber, and
   a plunger stopper mechanism having a radial pin hole formed in the tensioner body and communicating with the cylinder chamber, an annular pin stopper groove formed in a circumference of the plunger, and a stopper pin removably inserted through the radial pin hole into the annular pin groove to lock the plunger in an inoperative position in which the plunger is retracted into the cylinder chamber,
   the radial pin hole being substantially tangent to the bottom of the annular pin stopper groove, and having a center line extending parallel to a tangent to the bottom of the annular pin stopper groove and offset from the tangent toward an open side of the annular pin stopper groove, and a depth slightly greater than a diameter of the stopper pin, and
   the stopper pin having a side face held in contact with the bottom of the annular pin stopper groove.

2. A tensioner according to claim 1, wherein, when the stopper pin is removed from the annular pin stopper groove and the pin hole to allow the plunger to move in the direction to project from the cylinder chamber by the force of the plunger spring, the annular pin stopper groove is in radial alignment with an open end edge of the cylinder chamber.

3. A tensioner according to claim 1, wherein the stopper pin has a front end portion being resiliently flexed to thereby urge the side surface of the stopper pin into pressure contact with the bottom of the annular pin stopper groove.

4. A tensioner according to claim 3, wherein, when the stopper pin is removed from the annular pin stopper groove and the pin hole to allow the plunger to move in the direction to project from the cylinder chamber by the force of the plunger spring, the annular pin stopper groove is in radial alignment with an open end edge of the cylinder chamber.

* * * * *